United States Patent [19]

King

[11] Patent Number: 4,545,406

[45] Date of Patent: Oct. 8, 1985

[54] VALVE POSITION INDICATOR AND METHOD

[75] Inventor: Patrick D. King, Rantoul, Ill.

[73] Assignee: Flo-Con Systems, Inc., Champaign, Ill.

[21] Appl. No.: 482,496

[22] Filed: Apr. 6, 1983

Related U.S. Application Data

[63] Continuation-in-part of Ser. No. 221,933, Dec. 31, 1980, abandoned.

[51] Int. Cl.[4] .............................................. F16K 37/00

[52] U.S. Cl. .......................................... 137/553; 91/1; 364/510; 364/571

[58] Field of Search .................. 137/553, 554; 251/62; 91/1; 73/708, 37.5; 364/509, 510, 571

[56] References Cited

U.S. PATENT DOCUMENTS

| | | | |
|---|---|---|---|
| 2,802,483 | 8/1957 | Davis | 137/553 |
| 3,081,942 | 3/1963 | Maclay | 91/1 |
| 3,768,510 | 10/1973 | Reves | 137/553 |
| 3,822,377 | 7/1974 | Beck | 364/510 |
| 4,120,032 | 10/1978 | Mirdadian | 364/510 |
| 4,253,156 | 2/1981 | Lisle et al. | 364/510 |
| 4,404,638 | 9/1983 | Yada et al. | 364/571 |

*Primary Examiner*—Alan Cohan
*Assistant Examiner*—John A. Rivell
*Attorney, Agent, or Firm*—Jack E. Dominik

[57] ABSTRACT

Disclosed is a method and apparatus for indicating the position of a hydraulically actuated device by measuring the volume of hydraulic fluid flow in and out of the hydraulic actuator together with separate measurement corrections to compensate for the hydraulic system elasticity and transient flows and for the mechanical clearance or slop in the linkage between the actuator and the device. In a preferred embodiment of the method, the compensation for hydraulic system elasticity and transient flows is preferably made by measuring the relaxation reverse flow when the actuator is depressurized and using this measurement to offset an equal amount of the measured forward flow when the actuator is repressurized in the same direction. Further, the compensation for mechanical clearance in the linkage between the actuator and the device is applied only when the actuator direction is reversed; the amount of such compensation is empirically determined and may increase with wear and tear on the linkage. This compensated hydraulic fluid flow measurement as a position indicator is especially advantageous in indicating the position of a sliding gate valve used for teeming molten steel. The high temperature and corrosive environment about such a sliding gate valve preclude use of prior-art valve position indicators. However, the present invention permits the entire measurement apparatus to be located at a distance from the sliding gate valve.

2 Claims, 8 Drawing Figures

VALVE POSITION INDICATOR AND METHOD

CROSS-REFERENCE TO RELATED APPLICATIONS

This application is a continuation-in-part of application Ser. No. 221,933, filed Dec. 31, 1980 now abandoned.

BACKGROUND OF THE INVENTION

1. Field of the Invention

The present invention pertains to the control arts, and more particularly the indication of the position of a hydraulically actuated valve.

2. Description of the Prior Art

In the teeming of molten steel, refractory lined sliding gate valves are used to control the flow. Such sliding gate valves are typically hydraulically actuated, and the operator normally monitors the flow by simply watching the stream of molten steel. However, in such high temperature and corrosive environments, the accuracy of such visual inspection of flow will depend heavily in the skill and experience of the operator, and even with the most skillful operator the accuracy and repeatability of a sliding gate valve position is limited. Thus it is a problem with the prior art to accurately and repeatedly set the position of a sliding gate valve used for teeming molten steel.

The prior art also includes Davis U.S. Pat. No. 2,802,483 which discloses a mechanical valve position indicator for a hydraulically actuated gate valve. The position indicator is merely a pointer worm-geared to the valve stem. Such a mechanical valve position indicator has the usual problems with mechanical devices in high temperature and corrosive environments of ruggedness, warpage, and mechanical clearance between moving parts which limits accuracy and repeatability.

The prior art also includes Maclay U.S. Pat. No. 3,081,942 which discloses an electronic measurement of hydraulic control fluid flow as part of a digital-to-analog control device. The electronic measurement is made by counting pulses generated as the control fluid flow drives a pair of meshing gears which rotate past a magnetic transducer. However, Maclay fails to disclose any corrections to the fluid flow measurement to compensate for transients occurring when the fluid flow is stopped and restarted and to compensate for elimination and creation of mechanical clearances in the control member. Indeed, Maclay fails to even note the existence of such measurement problems.

SUMMARY

The present invention provides a method for indicating the position of a hydraulically actuated device by measuring the volume of hydraulic fluid flow in and out of the hydraulic actuator together with separate measurement corrections to compensate for the hydraulic system elasticity and transient flows and for the mechanical clearance or slop in the linkage between the actuator and the device. In a preferred embodiment of the method, the compensation for hydraulic system elasticity and transient flows is preferably made by measuring the relaxation reverse flow when the actuator is depressurized and using this measurement to offset an equal amount of the measured forward flow when the actuator is repressurized in the same direction. Further, the compensation for mechanical clearance in the linkage between the actuator and the device is applied only when the actuator direction is reversed; the amount of such compensation is empirically determined and may increase with wear and tear on the linkage.

These compensations solve the problems of the prior art in that even after repeated pressurizations and depressurizations of the actuator in both directions, the position of the device is still accurately indicated by the flow measurement. This compensated hydraulic fluid flow measurement as a position indicator is especially advantageous in indicating the position of a sliding gate valve used for teeming molten steel. The high temperature and corrosive environment about such a sliding gate valve preclude use of prior-art valve position indicators. However, the present invention permits the entire measurement apparatus to be located at a distance from the sliding gate valve.

The present invention also provides an apparatus for use with the method. A preferred embodiment of the apparatus includes a slave hydraulic actuator which is inserted in the hydraulic line to the device actuator; such slave hydraulic actuator drives a shaft encoder which provides a pair of electrical signals corresponding to movement and direction of such slave actuator. The pair of electrical signals is decoded to create a direction signal and a clock signal; the clock signal pulses are counted to indicate device position. The compensations for hydraulic system elasticity and for mechanical clearance are achieved by precluding the counting of a set number of clock pulses. Compensation for transients is made by counting clock pulses corresponding to hydraulic fluid flow during times that the actuator is not activated and storing this count in an auxiliary counter. This count in the auxiliary counter is then used to subtract from the count when the actuator is activated.

DESCRIPTION OF THE PREFERRED EMBODIMENTS

Figure 1:
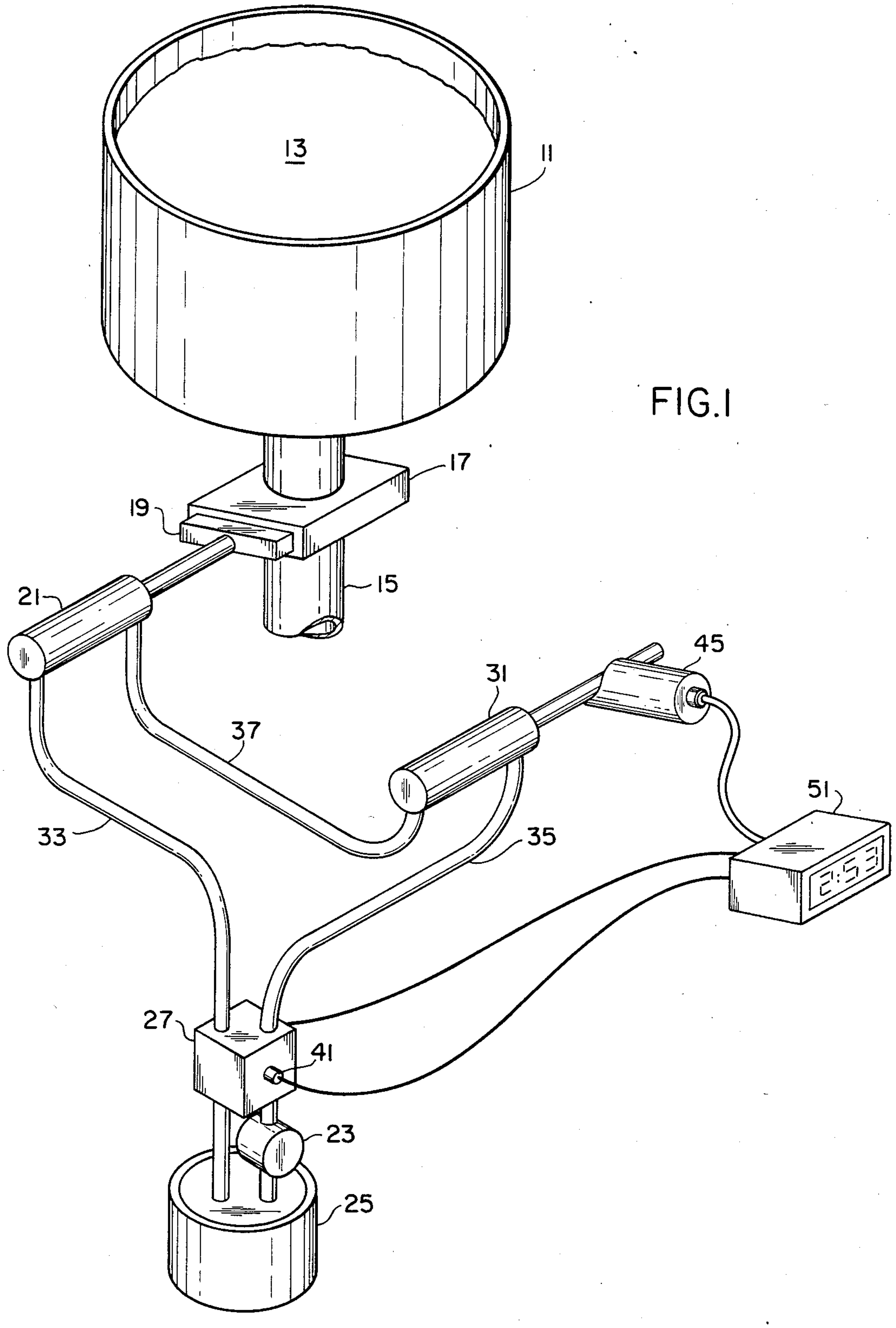
FIG. 1 diagrammatically shows a preferred embodiment of the inventive apparatus in place for use with a sliding gate valve.

FIG. 1 illustrates a set-up with which preferred embodiments of both the method and apparatus may be used. In particular, tundish 11 is shown filled with molten steel 13 which is teemed through nozzle 15. The teeming is controlled by sliding gate valve 17 which includes sliding gate 19 and hydraulic actuator 21 for pushing and pulling gate 19 in valve 17. Hydraulic actuator 21 is driven by hydraulic pump 23 which pumps hydraulic fluid out of reservoir 25 and through bi-direction valve 27. All of the items in FIG. 1, except actuator 21, may be located away from the hostile environment about valve 17.

Slave hydraulic cylinder 31 is used to measure the flow of hydraulic fluid into and out of actuator 21 as is described below. Note that for use in teeming molten steel a typical size for actuator 21 is a $3\frac{1}{4}$ inch bore and capable of a $3\frac{1}{2}$ inch stroke in two seconds which translates to approximately 29 cubic inches of hydraulic fluid flow at $14\frac{1}{2}$ cubic inches per second.

With valve 27 set to direct the output of pump 23 into hydraulic line 33, actuator 21 pushes sliding gate 19 into valve 17 and thereby decreases the opening in valve 17. Conversely, if valve 27 is set to direct the output of pump 23 into hydraulic line 35, then actuator 21 pulls gate 19 out of valve 17 and thereby increases the opening of valve 17. The inclusion of slave hydraulic cylinder 31 does not disrupt this operation because fluid flowing from valve 27 along line 35 into cylinder 31 causes the piston in cylinder 31 to move and thereby discharge an equal volume of fluid at an equal pressure into line 37 in thence into actuator 21. If valve 27 is set to disconnect the output of pump 23 from both lines 33 and 35, then actuator 21 is depressurized. Valve 27 is operated by two electrical solenoids, one for directing the output of pump 23 into line 33 and the other for directing the output of pump 23 into line 35. Solenoid 41 is shown mounted on the housing of valve 27. These two solenoids are wired so that they cannot be simultaneously activated, and when they are both deactivated valve 27 disconnects the output of pump 23 from both lines 33 and 35.

The motion of the piston in slave cylinder 31 corresponds, after compensation, to the motion of the piston in actuator 21 and gate 19, so selecting actuator 21 and slave cylinder 31 to be identical hydraulic cylinders yields virtually identical piston motions, although this certainly is not necessary. Indeed, slave cylinder 31 could be replaced with a hydraulic motor as a means for measuring the hydraulic fluid flow in lines 35 and 37.

The motion of the piston in slave cylinder 31 drives shaft encoder 45 whose electrical signal output is processed in box 51 and the sliding gate displayed as described below. This signal processing includes use of information on the status of the two valve 27 solenoids and is indicated by the wires from box 51 to the solenoids. The signal processing may be done by hardware, software, or a combination.

Figure 2:
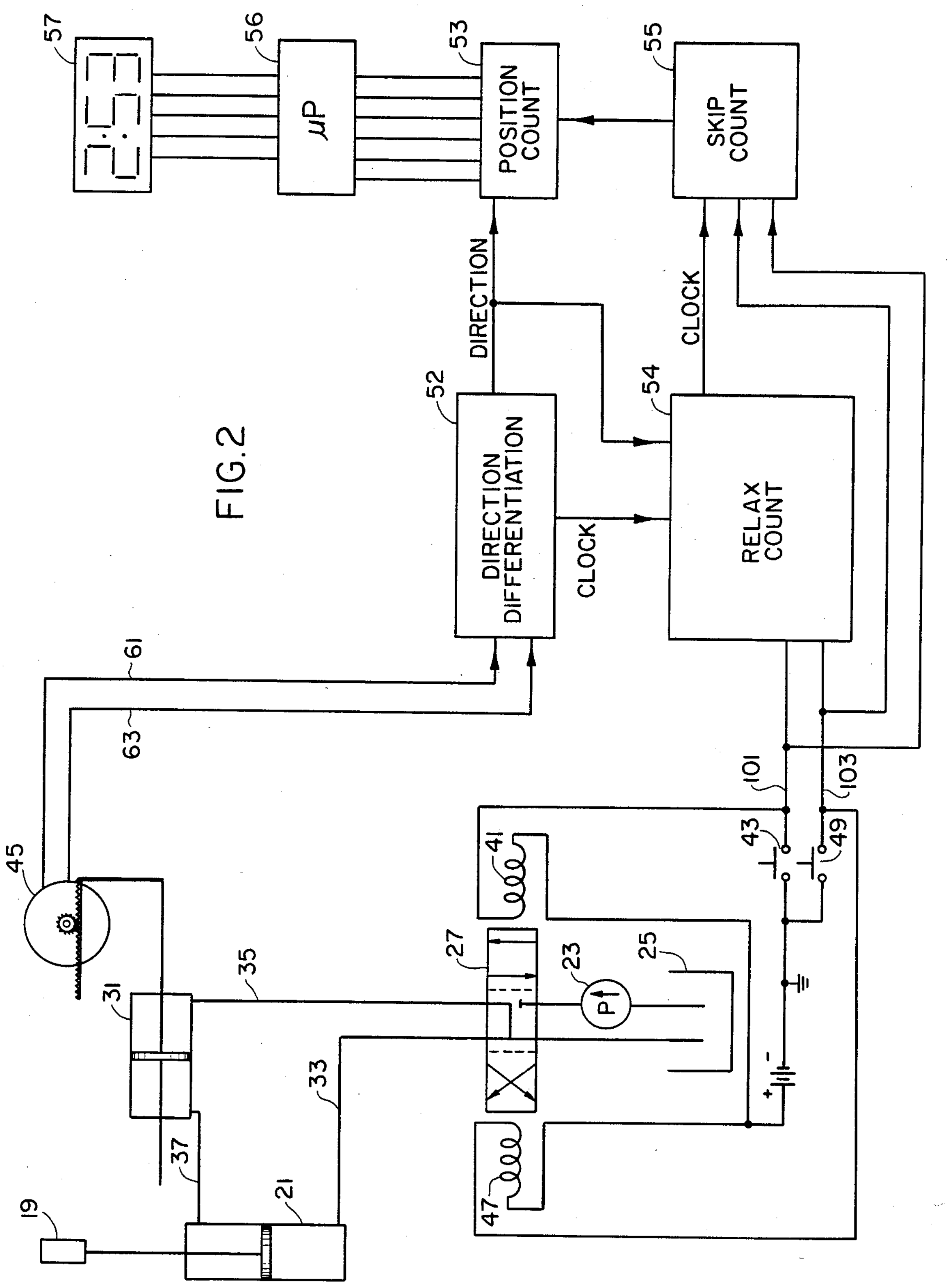
FIG. 2 is a partial block diagram showing the flow of hydraulic fluid and the electronic components of a preferred embodiment of the inventive apparatus; and FIGS. *3a–3f* are schematic diagrams of a portion of a preferred embodiment of the inventive apparatus.
Figure 3A:
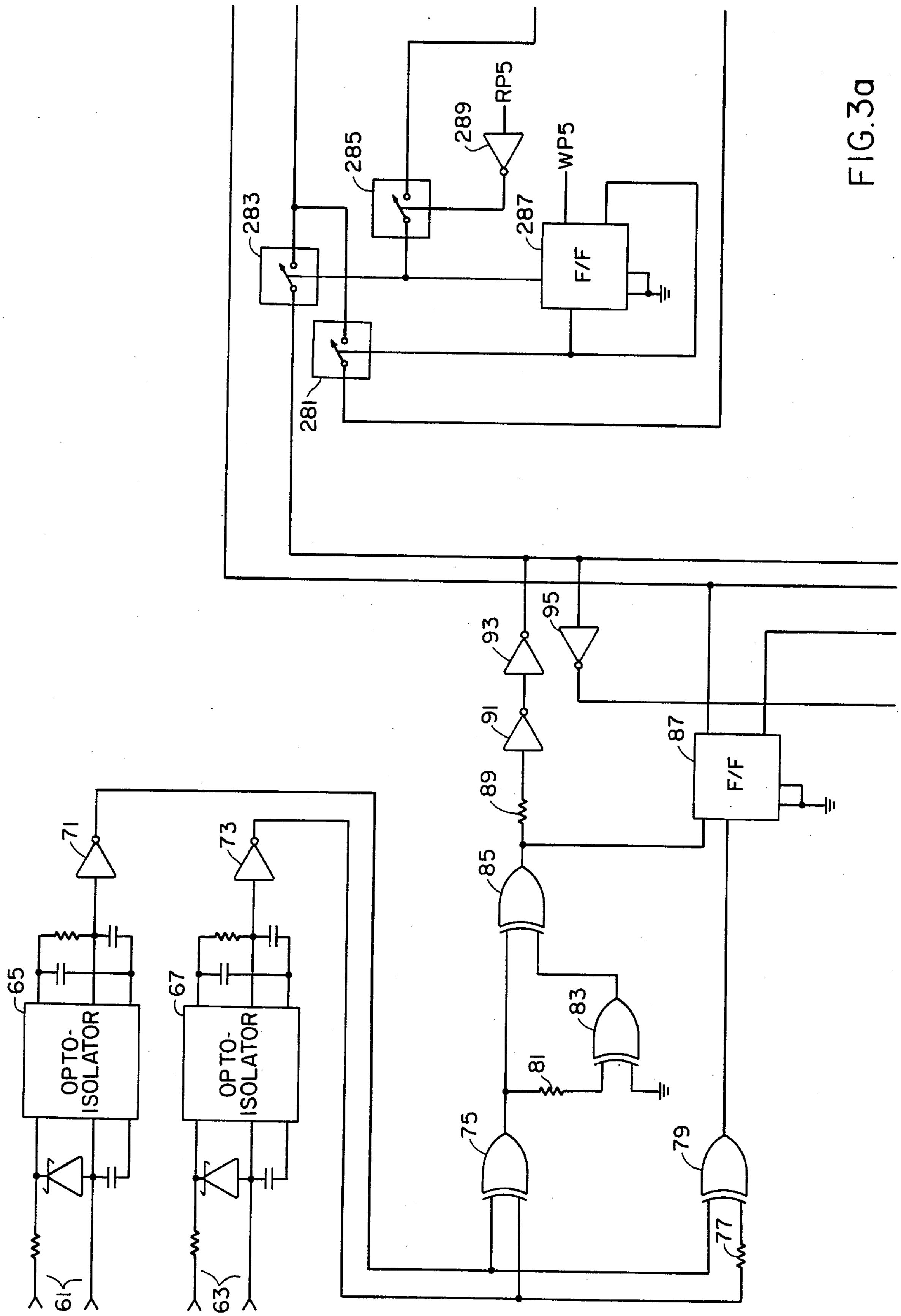
Figure 3B:
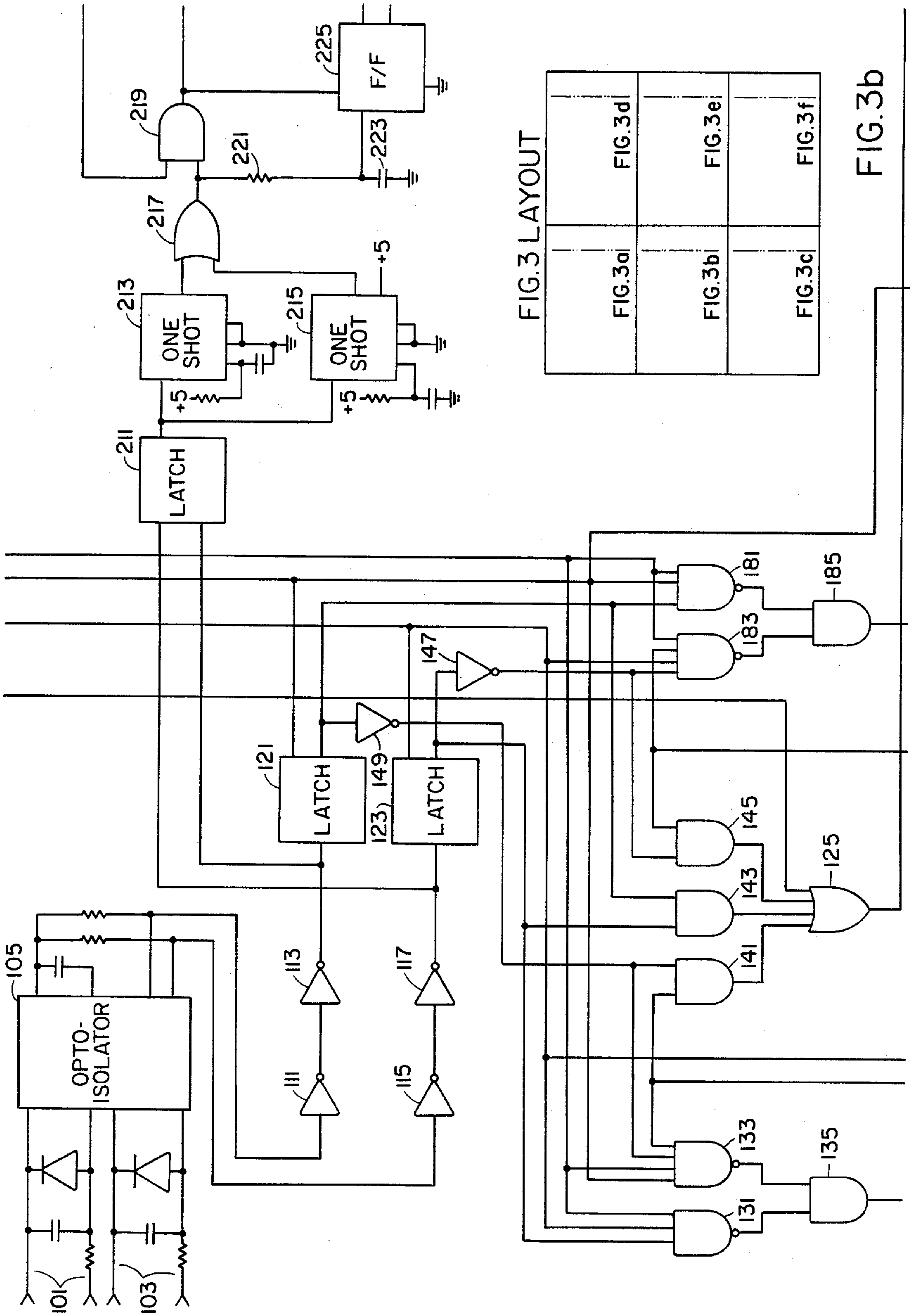
Figure 3C:
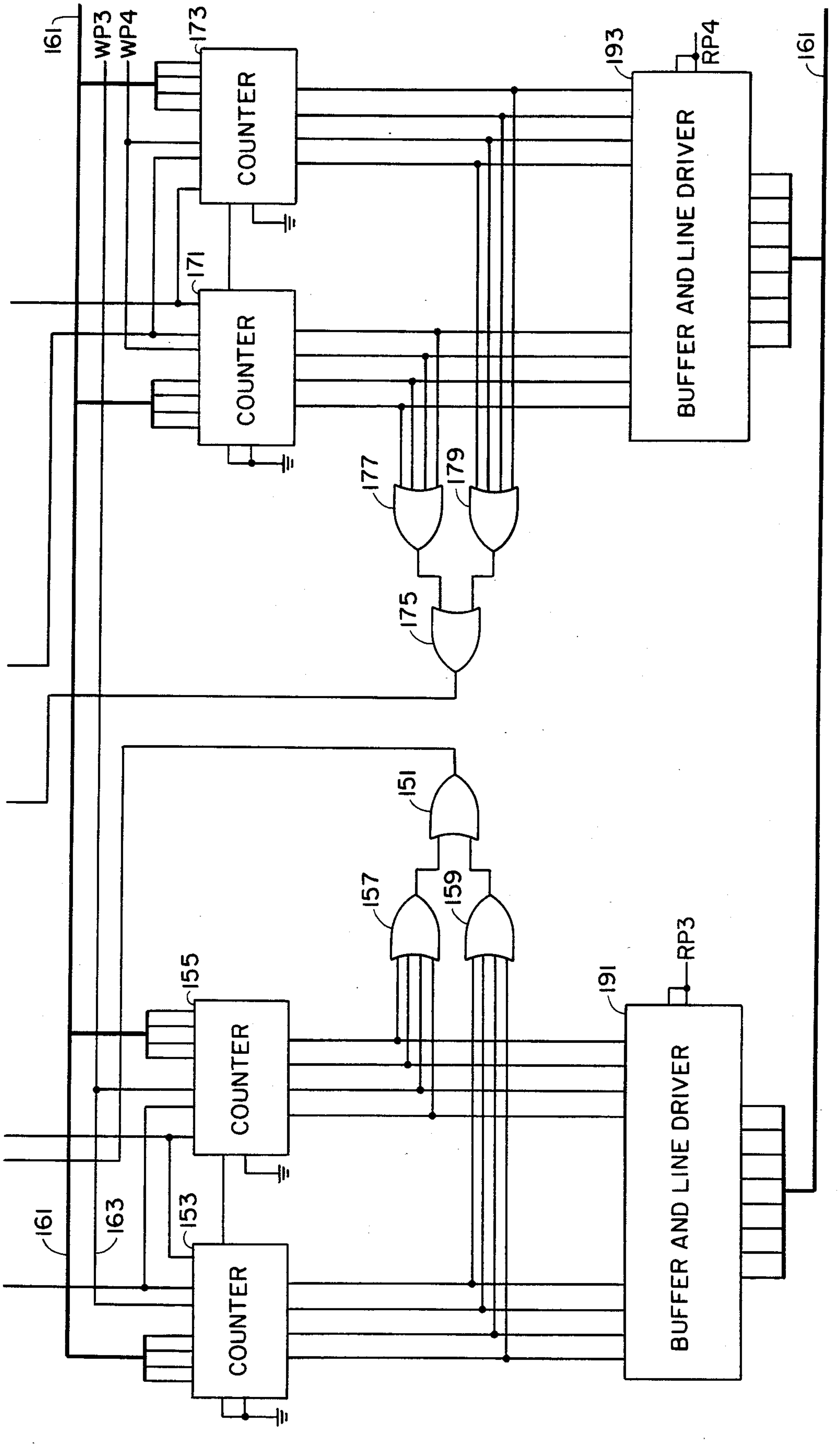
Figure 3D:
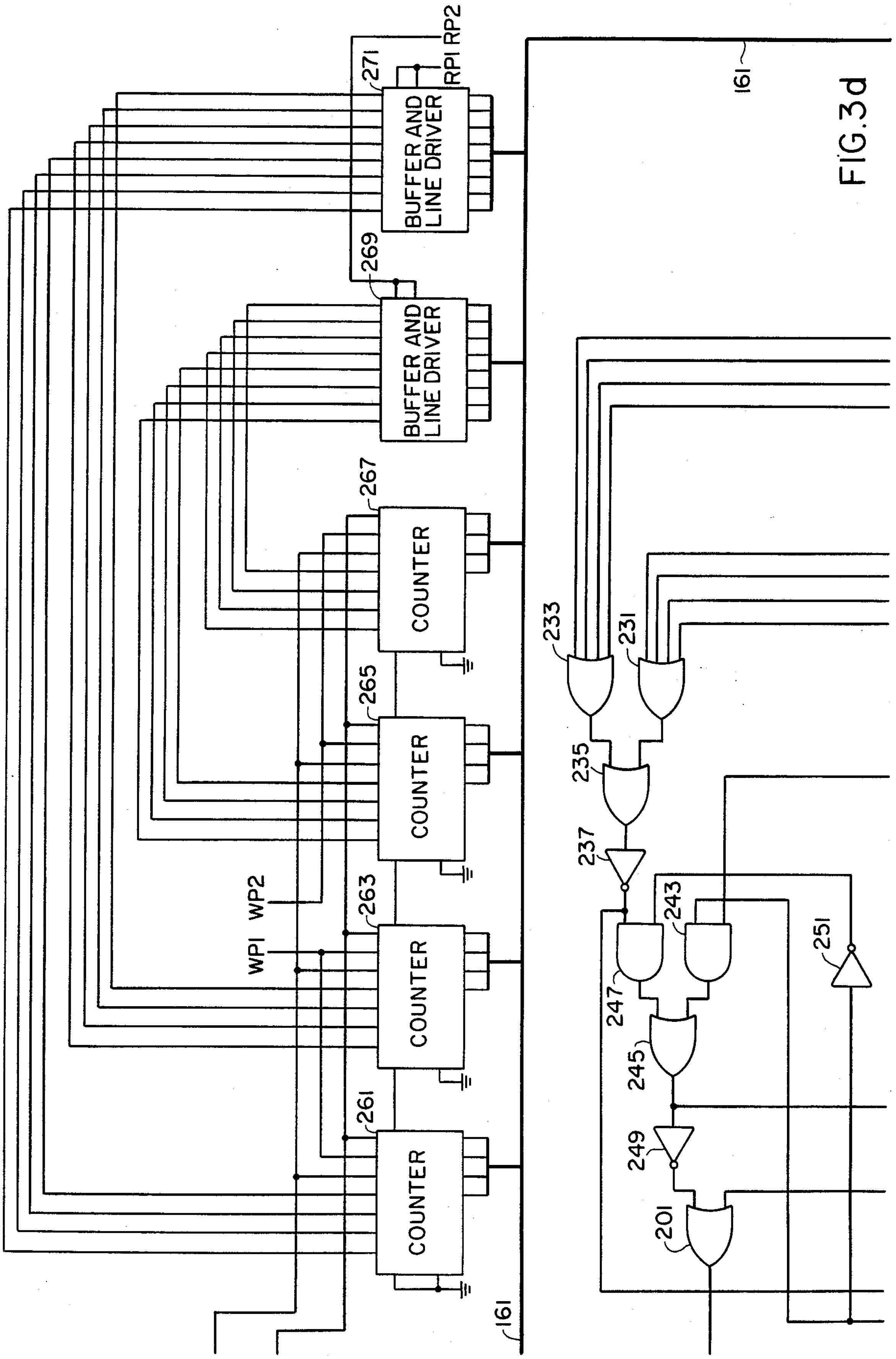
Figure 3E:
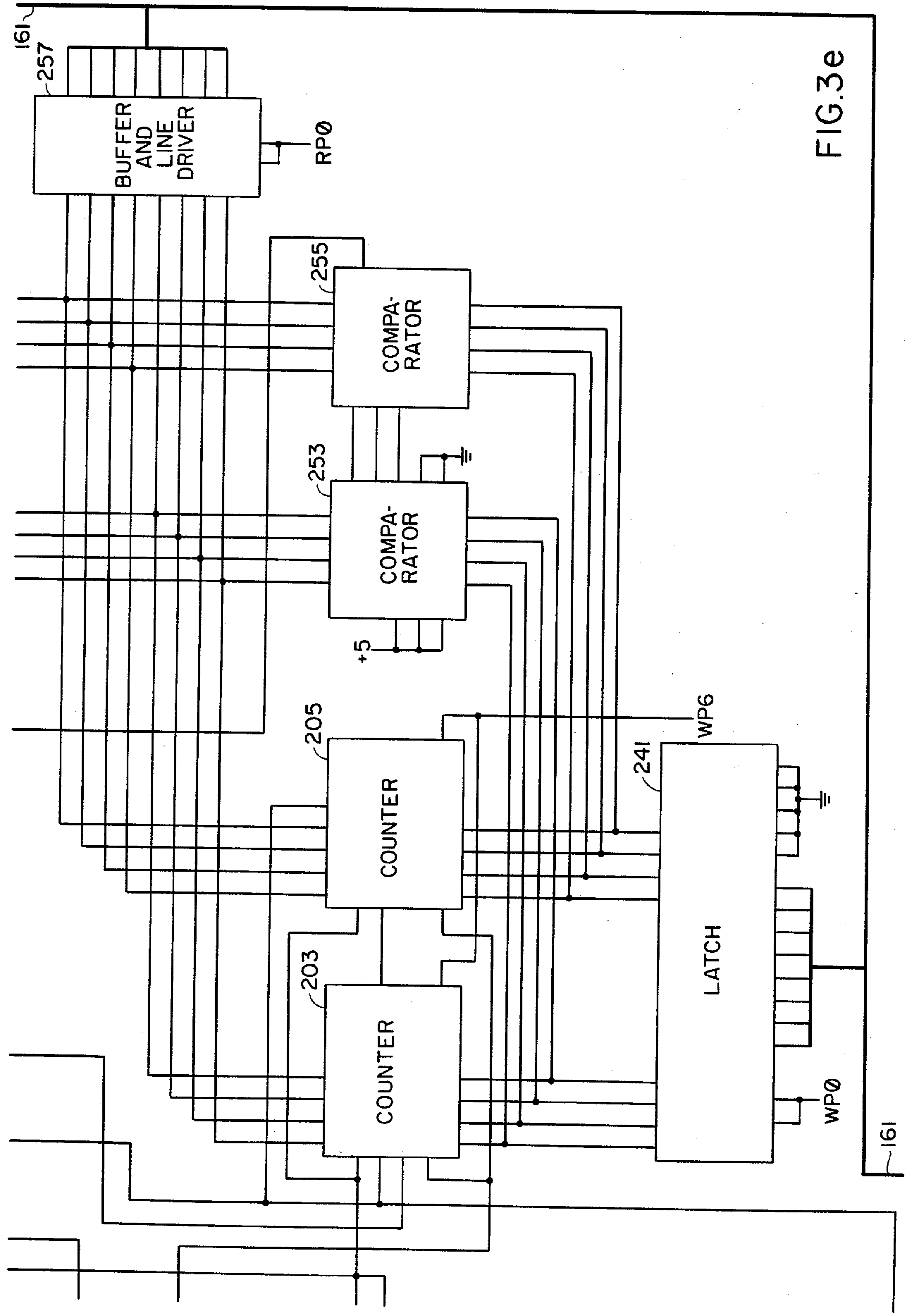
Figure 3F:
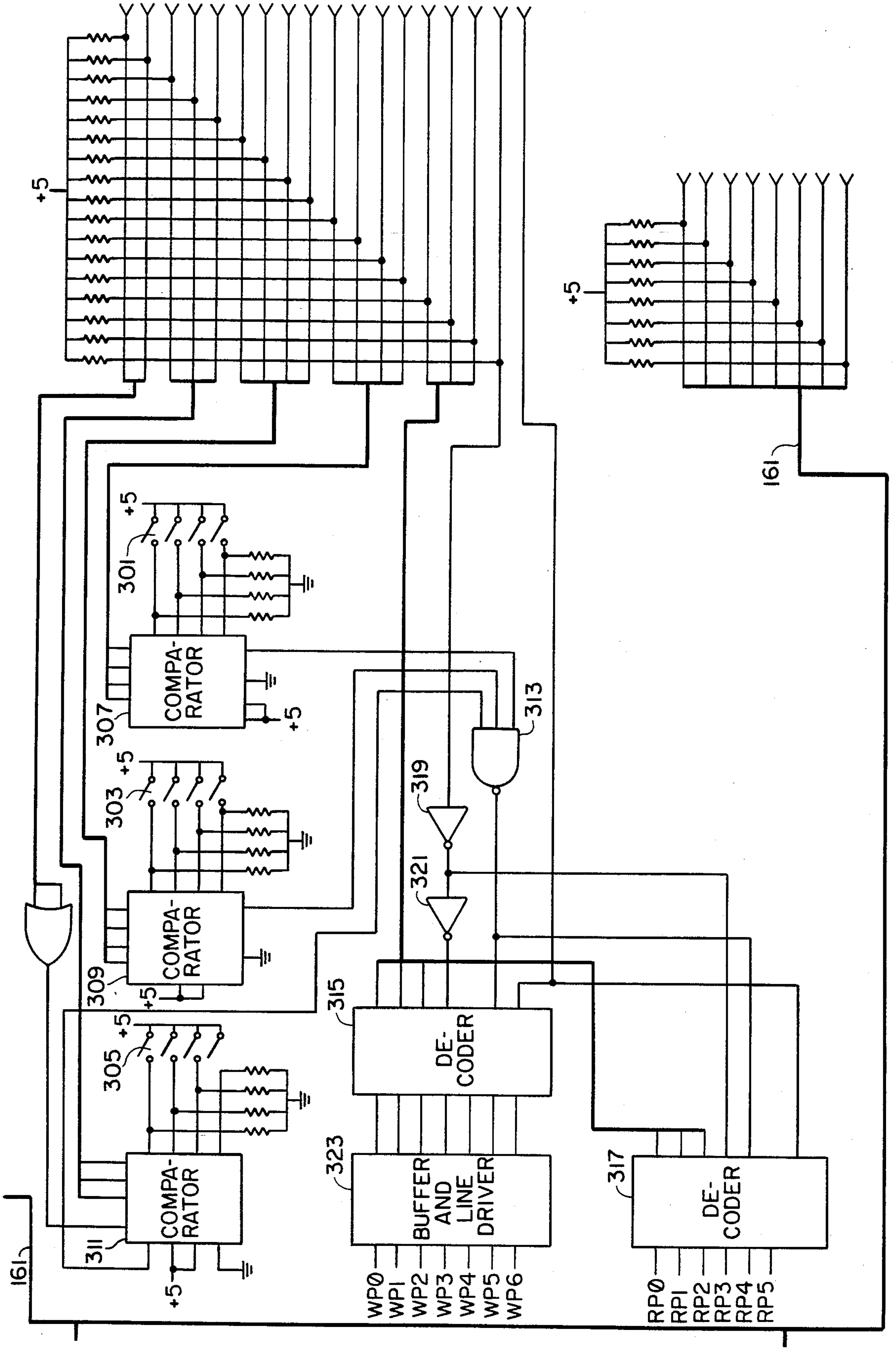

FIG. 2 provides a diagrammatic view of the set-up of FIG. 1 and also breaks the electronic circuitry in box 51 down into its functional blocks for a preferred embodiment of the apparatus. The functioning of this electronic circuitry will be explained below and in conjunction with FIG. 3.

Control of the teeming rates of molten steel 13 through sliding gate valve 17 is accomplished as follows:

If the teeming rate is satisfactory, directional valve 27 is set to cut off pump 23 from hydraulic lines 33 and 35 (as in FIG. 2) and thereby depressurize lines 33, 35 and 37, deactivate actuator 21, and keep sliding gate 19 stationary in valve 17.

If the teeming rate is too high, directional valve 27 is set by energizing solenoid 47 so that pump 23 pressurizes line 33 and activates actuator 21 to push sliding gate 19 into valve 17 to decrease the valve opening. The push by actuator 21 first eliminates mechanical clearances and only then does it move sliding gate 19. This pushing forces hydraulic fluid out of actuator 21 into line 37 and into and out of slave cylinder 31, through line 35, through directional valve 27 and back into reservoir 25. Once the valve 17 opening has decreased enough to bring the teeming rate down to satisfactory, directional valve 27 is set by deenergizing solenoid 47 to cut off pump 23, and thereby deactivate actuator 21, and depressurize hydraulic lines 33, 35 and 37. The depressurization causes a transient hydraulic fluid flow in lines 33, 35 and 37 as the previously-pressurized components (especially the hydraulic lines) relax and contract and the previously-compressed hydraulic fluid expands.

If the teeming rate is too low, directional valve 27 is set by energizing solenoid 41 so that pump 23 pressurizes line 35 (and thereby through slave cylinder 31 pressurizes line 37) and activates actuator 21 to pull sliding gate 19 out of valve 17 and increase the valve opening. Again, the initial portion of the pull eliminates mechanical clearances (in the opposite direction of the initial push). After a satisfactory teeming rate is obtained sliding gate 19 is stopped as before by deenergizing solenoid 41 and thereby setting valve 27 to cutoff pump 23, and again a transient hydraulic fluid flow occurs during relaxation.

Further, the teeming rate may desirably be decreased (or increased) in a series of pushes (or pulls) of sliding gate 19. During such a series of pushes, the pressurization/relaxation cycle just described is repeated many times, but the elimination of mechanical clearances only occurs on the initial push which is a change in direction.

The position of gate 19 in valve 17 (i.e., the amount that valve 17 is open) at any given time is determined by an analysis of the hydraulic fluid flows to and from actuator 21 from a known initial starting point of gate 19 up to the time of determination. The measurement of these flows and the corrections in the measurement to compensate for hydraulic system elasticity and mechanical clearance in the linkage between actuator 21 and gate 19 is shown in block diagram form in FIG. 2. In particular the output of encoder 45 on lines 61 and 63 is processed in direction differentiation block 52 which outputs two signals a Direction signal indicating the direction that encoder 45 is rotating and a Clock signal which consists of a series of pulses corresponding to the rotation. The Clock pulses will be counted in position count block 53 to determine the position of gate 19, but first the Clock pulses pass through relax count block 54 which compensates for the relaxation flows by preventing passage of a certain number of Clock pulses. Then the Clock pulses pass through skip count block 55 which compensates for the mechanical clearance elimination by preventing a certain number of Clock pulses from passing through. Lastly, the Clock pulses passing through both blocks 54 and 55 are counted in block 53 and the count data is processed by microprocessor 56, and the processed data display in display 57. The Direction signal determines whether block 53 is adding or subtracting as it counts the Clock pulses, and the Direction signal plus the status of solenoids 41 and 47 are used to perform the compensation in block 54, and the solenoid status is also used to perform the mechanical clearance compensation in block 55. Microprocessor 56 may be in communication with blocks 54 and 55 for setting initial data, etc. The output of microprocessor 56 may also be used to control the position of gate 19 as part of an automated valve.

To illustrate how the need for compensations in the measurement of hydraulic fluid flow arise, consider the sequence of events starting with the system in a relaxed state (pump 23 not connected to either line 33 or line 35) and then progressing through activation of valve 27 to drive actuator 21 to pull gate 19 partially out of valve 17 followed by valve 27 deactivating actuator 21 and the system returning to a relaxed state.

Initially pump 23 is operating but its output is blocked by valve 27; hydraulic lines 33, 35, and 37 are unpressurized and the pistons in actuator 21 and slave cylinder 31 are not moving. To initiate the pulling of gate 19, solenoid 41 is energized by closing switch 43 (see FIG. 2); the activation of solenoid 41 causes valve 27 to switch so that the output of pump 23 is directed into line 35. Thus line 35 is pressurized and this causes the piston in slave cylinder 31 to move to the left in FIG. 2 and force hydraulic fluid out into and thereby pressurizing line 37. Pressurized line 37 drives the piston in actuator 21 which, in turn, pulls gate 19 and forces hydraulic fluid into line 33 and thence back into reservoir 25. The motion of gate 19 corresponds to the flow in lines 33, 35, or 37 (these three flows being substantially equal) and to the motion of the pistons in actuator 21 and slave cylinder 31. The motion of the piston and slave cylinder 31 is translated into electrical pulses by rotary optical shaft encoder 45.

Two compensations to the measurement of flow by encoder 45 must be made: the first compensation for the elasticity in the hydraulic system, particularly line 37, and the second for mechanical clearance in the linkage from actuator 21 to gate 19. The first compensation accounts for flows such as that due to the piston of cylinder 31 moving and forcing hydraulic fluid into line 37, which elastically expands, but without moving the piston of actuator 21. This flow occurs each time the system is pressurized for a pulling of gate 19. Because the piston of slave cylinder 31 moves without any corresponding movement of the piston of actuator 21, this flow yields spurious valve position indication. However, upon depressurization of the system after the desired pull of gate 19 has been accomplished, the situation is reversed and the elastic contraction of line 37 leads to a flow into slave cylinder 31 and piston movement in the direction opposite that of pressurization. This causes encoder 45 to rotate in the opposite direction. Note that the piston in actuator 21 is presumed not to move during this elastic contraction by line 37; such presumption being based primarily on the friction of gate 19 in valve 17 greatly exceeding that of the coupling of the piston of slave cylinder 31 to encoder 45 together with the tensioned linkage between gate 19 and actuator 21's piston. In general, the pressurization of the system at the beginning of the pull includes flows due to the storing of strain energy, and at the end of the pull this strain energy is released to yield reverse direction flows. Thus the size of such pressurization flows is not crucial, but rather the compensation to the total flow by the reverse flow is.

The second compensation arises from the initial movement of the piston in actuator 21 which yields a tensioning of the linkage between the piston and gate 19 prior to any movement of gate 19. This tightening of the linkage only occurs when the direction of movement of gate 19 reverses; that is, if gate 19 has been just previously pushed in valve 17, then the initial movement of the piston in actuator 21 for a pulling of gate 19 (prior to the linkage being uncompressed and tensioned) will be measured because the piston of slave cylinder 31 will make a corresponding movement. However, note that if gate 19 had previously been pulled, then pressurization of the system for another pull will not require movement of the piston of actuator 21 to decompress the linkage and tension it because it had been previously tensioned. In short, a compensation for the mechanical clearance in the linkage between the piston of actuator 21 and gate 19 is made only when the direction of movement of gate 19 is reversed. In contrast to the elasticity compensation, the size of the flow due to the mechanical clearance in the linkage between the piston of actuator 21 and gate 19 must be empirically determined and used as the second compensation.

For a pushing of gate 19, the effects are analogous, although the elasticity compensation will likely be much smaller because line 33 and not lines 35 and 37 is connected to the output of pump 23 and the elasticity contraction will not cause substantial flow through slave cylinder 31. In FIG. 2 activating switch 49 energizes solenoid 47 and shifts valve 27 so that pump 23 pressurizes line 33 and leads to a pushing of gate 19.

Encoder 45 may be a model no. 52-A-ACF-200-A-0-00 as manufactured by Dynapar Corp. which generates two electrical signals, called the First Phase and the Second Phase. The First Phase and the Second Phase each consists of two hundred square wave pulses per revolution of encoder 45, and the First Phase and the Second Phase are generated 90° out of phase; the First Phase leads the Second Phase when encoder 45 is rotated in a first direction, and the First Phase lags the Second Phase when encoder 45 is rotated in the opposite direction. Consequently, the direction of rotation of encoder 45, and thus the direction of movement of the piston of slave cylinder 31, may be detected from a relative phase of the First Phase and Second Phase signals.

FIG. 3, in conjunction with FIG. 2, shows how these two compensations to correct the flow measurement are made in the preferred embodiment of the inventive apparatus. Encoder 45 outputs First Phase on line 61 and Second Phase on line 63 are first passed through opto-isolators 65 and 67, respectively, and then through inverting Schmitt triggers 71 and 73, respectively. Thus the First Phase and the Second Phase have been electrically isolated and squared up. Opto-isolators 65 and 67 may be of type HPCL-2602 as manufactured by Hewlett Packard. Inverting Schmitt triggers 71 and 73 may be of type 4584. First Phase and Second Phase are exclusively ORed in gate 75, and First Phase and a delayed Second Phase are exclusively ORed in gate 79; the delay of Second Phase is accomplished by resistor 77 and the chip capacitance at the inputs pins to gate 79. The output of gate 75 is delayed by resistor 81 and the chip input capacitance of gate 83, and this delayed version of the output of gate 75 is exclusively ORed with the output of gate 75 by gate 85. The delay by resistor 81 and gate 83 is set to be much shorter than the delay by resistor 77 and gate 79, such as by choosing the resistor 77 to be larger than resistor 81 by an order of magnitude. The output of gate 85 is then used to clock the output of gate 79 as data into D flip-flop 87. Thus in effect First Phase is compared with the earlier Second Phase (delayed) to indicate the momentary direction of rotation of encoder 45. Gates 75, 79, 83, and 85 may be of type 4070, and flip-flop 87 of type 4013.

The Q output of flip-flop 87 is high when First Phase leads Second Phase and is low when First Phase lags Second Phase, and thus it will be called the "Direction" signal.

The output of gate 85 is also passed through resistor 89 and inverters 91, 93 and 95; resistor 89 providing a delay in conjunction with the capacitance of the input to inverter 91. The output of inverter 95 is a series of low going pulses called the "Clock", and the Clock pulses are counted to determine the rotation of encoder 45; note that for each pulse of First Phase or Second Phase there will be two Clock pulses. Of course, the two compensations discussed above will be corrections in the total of Clock pulses counted and thereby convert the total to an indication of position of gate 19 in valve 17. Note that resistor 89 delays the Clock pulses so that Direction signal sets up before the Clock triggers a count. Direction differentiation block 52 contains the foregoing circuitry.

As illustrated in FIG. 2, if neither solenoid 41 nor 47 is energized, then lines 101 and 103 each carry a high signal into opto-isolator 105 (see FIG. 3). Optoisolator 105 may be of type HPCL 2630. The corresponding outputs of opto-isolator 105 are passed through Schmitt triggers 111/113 and 115/117, respectively, and then into the Not Reset inputs of latches 121 and 123, respectively. Schmitt triggers 111, 113, 115 and 117 may be of type 4584 and latches 121 and 123 may be of type 4044. Closing switch 43 and thereby energizing pull solenoid 41 causes the signal on line 101 to go low. This low signal passes through opto-isolator 105, Schmitt triggers 111 and 113, and resets latch 121 (i.e. the Q output goes low). Similarly, if switch 49 is closed to activate push solenoid 47, then the signal on line 103 goes low and this passes through optoisolator 105, Schmitt triggers 115 and 117, and resets latch 123. Latch 121 is set by the Direction signal changing from the pull direction to the push direction; and latch 123 is set by the Direction signal changing from the push direction to the pull direction. Consequently, the output of both latch 121 and latch 123 does not change when the corresponding solenoid is de-energized, but rather only when the direction of flow changes; this compensates for the fact that solenoids 41 and 47 do not instantaneously change the setting of valve 27 upon de-energization.

The hydraulic system elasticity compensation is made by two relaxation counters (in relax count block 54), one for gate 19 pushes and one pulls. Each relaxation counter counts the Clock pulses due to the corresponding elastic contraction relaxation flow and uses this sum to block the counting of an equal number of Clock pulses generated during the corresponding pressurization. These relaxation counters operate as follows for a pulling of gate 19.

First pull solenoid 41 is energized and this causes a low signal on line 101 which resets latch 121. Energizing pull solenoid 41 also shifts valve 27 to begin (after perhaps some inertial delay) moving the piston in slave cylinder 31 in the pull direction (to the left in FIG. 2) and thus also the piston in actuator 21 to begin tensioning the linkage to gate 19 and thereafter to pull gate 19 in valve 17. This movement of the piston in slave cylinder 31 causes encoder 45 to rotate in the pulling direction and generate First Phase and Second Phase pulses which, as previously explained, lead to the Direction signal (Q output of flip-flop 87) going high and Clock (output of inverter 95) low going pulses to be generated corresponding to the motion of encoder 45. The Direction signal going high implies that Not Direction (the Not Q output of flip-flop 87) goes low and sets latch 123.

The relaxation compensation occurs at OR-gate 125 which blocks the low going Clock pulses if and only if the output of any of AND-gates 141, 143 and 145 is high. As discussed above, during the pulling of gate 19 the output of latch 121 is low, thus making the output of AND-gate 143 low, and the output of latch 123 is high but this is inverted by inverter 147, thus making the output of AND-gate 145 also low. Consequently, the output of AND-gate 141 determines whether Clock pulses are passed through OR-gate 125. The inputs to AND-gate 141 are the output of latch 121 after inversion by inverter 149, and thus high, and the output of OR-gate 151. The output of OR-gate 151 is high if and only if the output of counters 153 and 155 are both not zero because the outputs are ORed together by OR-gates 157 and 159. Counters 153 and 155 may be of type 4516 and are 4-bit up/down counters; the overflow of counter 153 carrying into counter 155. How counters 153 and 155 acquire a non-zero output will be explained below, so presuming a non-zero output the counting of the Clock pulses proceeds as follows. The Not Direction signal is low so counters 153 and 155 are in the count down mode. The output of inverter 93, which is essentially Not Clock, is inputted into NAND-gates 131 and 133. The Not Direction signal and the output of latch 123 are also inputted into NAND-gate 131, but Not Direction is low so the output of NAND-gate 131 is high. The inputs of NAND-gate 133, in addition to Not Clock, are the Direction signal (which is high), the inverted output of latch 121 (also high), and the output of OR-gate 151 (which is high for as long as the output of counters 153 and 155 is non-zero). Thus the Not Clock pulses pass through NAND-gate 133 with inversion until the output of counters 153 and 155 is zero. Thus the inputs to AND-gate 135 are the high from NAND-gate 131 and the Clock from NAND-gate 133, so the output of AND-gate 135 is essentially the Clock signal which is fed into counters 153 and 155 count input. Thus the Clock pulses are used to count down until counters 153 and 155 are zero, and this zero drives OR-gate 151 low so that the counting down is blocked at NAND-gate 133. Consequently, AND-gate 141 goes low to unblock the Clock pulses from passing through OR-gate 125.

Counters 153 and 155 may acquire a positive output in two ways: first the counters may be loaded with the data on 8-bit bus 161 by applying a load signal on line 163; this may be used to initialize counters 153 and 155. But more importantly, counters 153 and 155 count up the Clock pulses during the hydraulic system elasticity relaxation flow as will now be described. Presume that pull solenoid 41 is de-energized, that is, the pulling of gate 19 is to be stopped or reversed to a pushing. De-energizing pull solenoid 41 causes, after some inertial deay, valve 27 to cut off pump 23 and depressurize line 35. As described above, this also results in line 37 being depressurized and the piston of slave cylinder 31 moving in the push direction and rotating encoder 45 counterclockwise in FIG. 2. This is the pull relaxation flow. Once encoder 45 rotates in the counterclockwise direction, the Direction signal goes low and this causes the output of latch 121 to go high; note that the output of latch 123 remains high until push solenoid 47 is energized. Consequently, both inputs to AND-gate 143 are now high and this blocks Clock pulses from passing OR-gate 125. This change in the Direction signal and the output of latch 121 causes NAND-gate 133 to block the Not Clock even if counters 153 and 155 become non-zero, and NAND-gate 131 to pass with inversion the Not Clock pulses. Thus AND-gate 135 passes the Clock pulses which are then fed into the count input of counters 153 and 155; however, because the Not Direction signal has gone high counters 153 and 155 are in the up count mode. Thus the Clock pulses generated during the pull relaxation flow are all counted and stored in counters 153 and 155. Consequently, the number of Clock pulses which were blocked by OR-gate 125 while counters 153 and 155 count down during the pulling, as described above, just equal the number of Clock pulses generated and stored in counters 153 and 155 during the pull relaxation reverse flow.

The blocking of Clock pulses at OR-gate 125 during a pushing of gate 19 and the push relaxation flow are analogous and to the just-described pulling and pull relaxation with counters 171 and 173 corresponding to counters 153 and 155, OR-gates 175, 177 and 179 corresponding to OR-gates 151, 157 and 159, NAND-gates 181 and 183 corresponding to NAND-gates 131 and 133, and AND-gate 185 corresponding to AND-gate 135. Similarly, AND-gate 145 corresponds to AND-gate 141.

Buffer and line drivers 191 and 193 permit communication with the outputs of counters 153, 155, 171 and 173 through eight-bit bus line 161, as described in more detail below.

After relaxation compensation has been made at OR-gate 125, Clock pulses proceed to OR-gate 201 at which mechanical deflection compensation is made by blocking a set number of pulses; the set number of pulses being previously loaded into counters 203 and 205, and the blocking achieved by counting down counters 203 and 205 to zero upon a change from pushing to pulling or vice versa, as will now be described in detail. Upon a change from pushing gate 19 to pulling gate 19 the signal on line 101 goes from high to low, and this signal passes through opto-isolator 105, Schmitt inverters 111 and 113, and then sets the output of latch 211 high. Latch 211 may be of type 4044. (Analogously, a change from pulling to pushing causes the signal on line 103 to go low which passes through opto-isolator 105, Schmitt inverters 115 and 117 and then resets latch 211 output low.) The transition of latch 211 output from low to high triggers one-shot 213; similarly, the transition of latch 211 output from high to low triggers one-shot 215. One-shots 213 and 215 may be of type 4528. An output pulse from either one-shot 213 or one-shot 215 passes through OR-gate 217 and is inputted to AND-gate 219 and also, after a delay by resistor 221 and capacitor 223 inputted to the clock input of the flip-flop 225. Flip-flop 225 may be of type 4013. If the output of counters 203 and 205 is zero, then a low is passed through OR-gates 231, 233 and 235, and inverted by inverter 237 to provide a high input to AND-gate 219; this allows the previously noted pulse output from OR-gate 217 to pass through AND-gate 219. However, if counters 203 and 205 output is non-zero, then AND-gate 219 blocks this output pulse from OR-gate 217 by the same OR-gates 231, 233 and 235 and inverter 237. Counters 203 and 205 may be type 4516.

Thus presuming that counters 203 and 205 output is zero, the output pulse from OR-gate 217 due to the change from push to pull passes through AND-gate 219 and both sets flip-flop 225 and loads counters 203 and 205 with the data held by latch 241. Data is entered into latch 241 from eight-bit bus 161. Latch 241 may be of type 4508. The setting of flip-flop 225 causes its Not Q output to go low and this puts counters 203 and 205 into the down count mode. The loading of counters 203 and 205 provides a high output on OR-gate 235 and thus a low input to AND-gate 219, thereby blocking any further pulses from OR-gate 217 until counters 203 and 205 have been counted down to zero. The delay by resistor 221 and capacitor 223 is set to be less than the time for the loading of counters 203 and 205 to ripple through OR-gates 231, 233 and 235 and inverter 237 and AND-gate 219 so that for an OR-gate 217 output pulse which passes through AND-gate 219, the delayed version of this pulse will not clock flip-flop 225 because the set input to flip-flop 225 is still high.

Clock pulses now count down loaded counters 203 and 205 because the carry-in input to counter 203 is low, as follows: The setting of flip-flop 225 (i.e. the Not Q output low) which is inputted to AND-gate 243 and thus AND-gate 243 outputs a low into OR-gate 245. And as seen before, with counters 203 and 205 not zero the output of inverter 237 is low and this drives the output of AND-gate 247 low which is the other input to OR-gate 245. Consequently, the output of OR-gate 245 is low and is the carry-in input for counter 203.

The low output of OR-gate 245 is inverted by inverter 249 and thus is a high input to OR-gate 201 and thereby blocks the Clock pulses which are low going. Once the Clock pulses have counted counters 203 and 205 down to zero, then the output of inverter 237 goes high and the output of AND-gate 247 also goes high because its other input is the low Not Q output of flip-flop 225 after inversion by inverter 251. This high output of AND-gate 247 passes through OR-gate 245 and is inverted to low by inverter 249, thus the Clock pulses are no longer blocked at OR-gate 201.

If a second change of direction of gate 19 is made after a first change of direction but before counters 203 and 205 have been counted down to zero, then the pulse generated by one of one-shots 213 and 215 passes through OR-gate 217 but is blocked at AND-gate 219 because the other input is low reflecting the non-zero state of counters 203 and 205. However, the OR-gate 217 output pulse passing through the delay of resistor 221 and capacitor 223 does clock flip-flop 225 because the output of AND-gate 219 is low. This clocking of flip-flop 225 causes the Not Q output to go high because the D input was low. The Not Q output of flip-flop 225 going high shifts counters 203 and 205 into the up count mode and further provides a high input to AND-gate 243 and a low input to AND-gate 247. With counters 203 and 205 in the up count mode, Clock pulses cause the counters to count up until they reach the initial total loaded from latch 241. At this point comparators 253 and 255 are triggered to output a high to AND-gate 243. Thus the output of AND-gate 243 goes high and this passes through OR-gate 245 and is inverted by 249 to a low so that OR-gate 201 no longer blocks the Clock pulses. Also, the high output of OR-gate 245 provides a high carry-in to counter 203 so that further Clock pulses do not change the total stored in counters 203 and 205. In effect, the first reversal of direction of gate 19 began an elimination of mechanical clearance but prior to completion of this elimination the direction was reversed again and the partial elimination undone which should have generated an equal number of Clock pulses as the original partial elimination. Thus the number of Clock pulses not counted during the up count in counters 203 and 205 equals the number of Clock pulses not counted in the down count. Buffer and line driver 257 provides communication with the output of counters 203 and 205 by 8-bit bus 161.

Clock pulses, after relaxation compensation at OR-gate 125 and mechanical clearance compensations at OR-gate 201, are counted in position counters 261, 263, 265 and 267; all of which counters may be 4-bit up/-down counters of type 4516. The Direction signal determines whether the counting is up (for pulling gate 19) or down (for pushing gate 19). The outputs of counters 261 through 267 is available on 8-bit bus 161 through buffer and line drivers 269 and 271. Thus the position count from counters 261 through 267 is read off of bus 161 by microprocessor 56 (see FIG. 2) which then may convert the raw count into engineering units so that the position of gate 19 may be displayed in display 57 in familiar terms. Similarly, microprocessor 56 can load the initial count in both the pull relaxation counters 153 and 155 and the push relaxation counters 171 and 173, as previously described, and may read the output of such counters from bus 161 through buffer and line drivers 191 and 193.

For diagnostic purposes switches 281, 283 and 285 are included and operate as follows. During normal operation switch 281 is closed so that Clock pulses pass through it and into position counters 261 through 267. Opening switch 281 and closing switch 283 permits the Not Clock pulses from inverter 93 to bypass the relaxation compensation and the mechanical clearance compensation and be directly counted in counters 261 through 267. Flip-flop 287 controls switches 281 and 283 which are toggled by write pulses clocking flip-flop 287. Determination of which of switches 281 and 283 is closed may be read by pulsing inverter 289 which closes switch 285 and reading the result on the first bit of 8-bit bus line 161. Switches 281–285 may be of type 4066, and flip-flop 287 of type 4013.

Control by a central microprocessor may be accomplished as shown in the addressing circuit in FIG. 3 as follows. Presuming a microprocessor with 8-bit data and 16-bit address ports, the 8-bit data port is connected to 8-bit bus 161, and the 16-bit addresses broken down into bits A0–A2 for selection of the function to be performed and bits A3–A15 for addressing a particular sliding gate valve 17. The valve address is set by switches 301, 303 and 305, each being a four independent pole switch. The pattern of off/ons set by switches 301–305 is compared to the signals on address lines A3–A13 by comparators 307, 309 and 311, which may be of type 4585. If all three comparators show that the switch pattern equals the address pattern, then NAND-gate 313 provides a low pulse to one of the enable inputs of decoders 315 and 317. Decoders 315 and 317 may be of type 74HC138. Address lines A0–A2 are the select inputs for decoders 315 and 317, and thus the read or write function selected. The read/write output of the microprocessor is inverted by Schmitt trigger 319 and fed to an enable input of decoder 317, and inverted again by Schmitt trigger 321 and fed to an enable input of decoder 315, thus the read/write selection is made by enabling either decoder 315 or decoder 317. The micrprocessor clock is fed into the G1 enable input of decoders 315 and 317 so that the read/write functions are synchronized. Buffer and line driver 323 is used on the output of decoder 315 to provide the write signals.

The majority of the circuitry shown in FIG. 3 could be replaced by equivalent software. That is, the First Phase and Second Phase could be inputted to a microprocessor along with the pull solenoid and push solenoid signals, and all of the processing done by software. Similarly, the Clock and Direction signals could be used in place of the First Phase and Second Phase, and rest of the processing being done by software.

What is claimed is:

1. A method for continuously monitoring the position of a device driven by a hydraulic system in which there is flexibility in expansion and contraction of the hydraulic system when it is pressurized and when the pressure is relaxed and also in which lost motion is inherent due to mechanical clearances, comprising the steps of:

(a) continuously measuring the volume and direction of flow of the driving hydraulic fluid, (b) continuously computing a net uncorrected volume of flow by subtracting the volume of flow in a first direction from the volume of flow in the opposite direction, (c) continuously computing a first corrected volume of flow by correcting the net uncorrected volume of flow for flows due to the expansion of the hydraulic system, (d) continuously computing a second corrected volume of flow by correcting the first corrected volume of flow for flows due to the relaxation of the hydraulic system, (e) continuously computing a final corrected volume of flow correcting the second corrected volume of flow for flows due to lost motion elimination of mechanical clearances in the system and device, and (f) continuously converting the final corrected volume of flow to a signal for the position of the device.

2. Apparatus for monitoring the position of a device driven by a hydraulic system in which there is flexiblity in expansion and contraction of the hydraulic system when it is pressurized and when the pressure is relaxed and also in which lost motion is inherent due to mechanical clearances, comprising:

means for measuring the volume and direction of flow of the driving hydraulic fluid, means for computing a net uncorrected volume of flow by subtracting the volume of flow in a first direction from the volume of flow in the opposite direction, means for computing a first corrected volume of flow by correcting the net uncorrected volume of flow for flows due to the expansion of the hydraulic system, means for computing a second corrected volume of flow by correcting the first corrected volume of flow for flows due to the relaxation of the hydraulic system, means for computing a final corrected volume of flow correcting the second corrected volume of flow for flows due to lost motion elimination of mechanical clearances in the system and device, and means for converting the final corrected volume of flow to a signal for the position of the device.

* * * * *